United States Patent
Yao (10) Patent No.: US 10,959,255 B2
(45) Date of Patent: Mar. 23, 2021

(54) METHOD AND APPARATUS FOR ALLOCATING UPLINK RESOURCES

(71) Applicant: Alcatel Lucent, Nozay (FR)

(72) Inventor: Jinsong Yao, Shanghai (CN)

(73) Assignee: Alcatel Lucent, Nozay (FR)

(*) Notice: Subject to any disclaimer, the term of this patent is extended or adjusted under 35 U.S.C. 154(b) by 0 days.

(21) Appl. No.: 16/474,652

(22) PCT Filed: Dec. 20, 2017

(86) PCT No.: PCT/IB2017/001701
§ 371 (c)(1),
(2) Date: Jun. 28, 2019

(87) PCT Pub. No.: WO2018/122604
PCT Pub. Date: Jul. 5, 2018

(65) Prior Publication Data
US 2020/0008219 A1 Jan. 2, 2020

(30) Foreign Application Priority Data
Dec. 30, 2016 (CN) .......................... 201611259493.6

(51) Int. Cl.
H04W 72/12 (2009.01)
H04W 4/70 (2018.01)
H04L 5/00 (2006.01)
H04W 72/04 (2009.01)

(52) U.S. Cl.
CPC ....... *H04W 72/1268* (2013.01); *H04L 5/0039* (2013.01); *H04L 5/0044* (2013.01); *H04W 4/70* (2018.02); *H04W 72/0446* (2013.01)

(58) Field of Classification Search
CPC ...... H04L 5/0039; H04L 5/0044; H04W 4/70; H04W 72/0446; H04W 72/1268; H04W 88/02
(Continued)

(56) References Cited

U.S. PATENT DOCUMENTS

2016/0249327 A1  8/2016  Chen et al.
2017/0238292 A1* 8/2017  Rico Alvarino ..... B65D 19/385
                                                370/329

(Continued)

FOREIGN PATENT DOCUMENTS

CN    101984719 A    3/2011
CN    102769913 A    11/2012
CN    104602346 A    5/2015

OTHER PUBLICATIONS

Sony, "Coexistence of eMTC and NB-IoT," 3rd Generation Partnership Project (3GPP), 3GPP TSG RAN WG1 Meeting #83, R1-156693, 4 pages, XP051003078, Anaheim, USA, Nov. 15-22, 2015.

(Continued)

*Primary Examiner* — Robert J Lopata
(74) *Attorney, Agent, or Firm* — Fay Sharpe LLP (57) ABSTRACT

Embodiments of the present disclosure provide a method and apparatus for allocating an uplink resource, which may schedule the NB-IoT terminal and the eMTC terminal to commonly use the uplink physical resource block configured to the NB-IoT terminal and the uplink physical resource block configured to the eMTC terminal, such that the utilization of the uplink frequency is enhanced and an uplink capacity of the cell is also improved, while guaranteeing normal operation of the cell network.

14 Claims, 4 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2017/0265168 A1* | 9/2017 | Wang | H04L 67/12 |
| 2017/0332357 A1* | 11/2017 | Xu | H04W 4/029 |
| 2017/0332440 A1* | 11/2017 | Xu | H04L 67/104 |
| 2018/0069589 A1* | 3/2018 | Liu | H04B 7/2634 |
| 2018/0077689 A1* | 3/2018 | Rico Alvarino | H04W 72/042 |
| 2019/0069150 A1* | 2/2019 | Blankenship | H04W 4/70 |
| 2019/0208532 A1* | 7/2019 | Priyanto | H04L 5/0094 |
| 2020/0053516 A1* | 2/2020 | Sui | H04W 4/08 |

OTHER PUBLICATIONS

Ericsson, "Support of NB-IoT and eMTC in the same cell," $3^{rd}$ Generation Partnership Project (3GPP), 3GPP TSG RAN WG1 Meeting #84, R1-160257, pp. 1-4, XP051064075, St. Julian's, Malta, Feb. 15-19, 2016.

Panasonic, "Commonality design between eMTC and NB-IOT," $3^{rd}$ Generation Partnership Project (3GPP), 3GPP TSG RAN WG1 Meeting #82bis, R1-155776, pp. 1-5, XP051041871, Malmo, Sweden, Oct. 5-9, 2015.

International Search Report for PCT/IB2017/001701 dated Mar. 28, 2018.

English Bibliography of Chinese Patent No. CN101984719A, Published on Mar. 9, 2011, Printed from Derwent Innovations on Aug. 4, 2020, 6 pages.

English Bibliography of Chinese Patent No. CN102769913A, Published on Nov. 7, 2012, Printed from Derwent Innovations on Aug. 4, 2020, 6 pages.

English Bibliography of Chinese Patent No. CN104602346A, Published on May 6, 2015, Printed from Derwent Innovations on Aug. 4, 2020, 6 pages.

Written Opinion of the International Searching Authority for PCT Application No. PC/IB2017/001701, dated Mar. 28, 2018, 9 pages.

* cited by examiner

METHOD AND APPARATUS FOR ALLOCATING UPLINK RESOURCES

FIELD

The present disclosure generally relates to the field of wireless communications, and more particularly to a method and apparatus for allocating uplink resources in a wireless communication system.

BACKGROUND

With expedite development in recent years, IoT (Internet of Things) have become well known to people. IoT network deployment will explode in the coming several years. Many communication operators have developed their commercial deployment planning. In the future, a considerable number of IoT terminals will be accessed to the IoT network.

The $3^{rd}$ Generation Partnership Project (3GPP) provides two kinds of technologies to support IoT cellular network. One is enhanced Machine Type Communication (eMTC), also referred to as CAT-M (LTE UE Category Machine); and the other is Narrow Band Internet of Things (NB-IoT). As IoT user terminals of both types i.e., eMTC and NB-IoT, will be present in the IoT network, an LTE wireless communication network is required to support both eMTC terminals and NB-IoT terminals. This also means that more frequency resources need to be allocated to support eMTC and NB-IoT, with one frequency band for eMTC and the other frequency band for NB-IoT. Therefore, it is a task worthy of study regarding how to simultaneously support eMTC and NB-IoT with efficient utilization of frequency resources and with fewer frequency resources.

SUMMARY

According to embodiments of the present disclosure, it is desired to provide a method and apparatus for allocating uplink resources in a communication system, thereby capable of scheduling a NB-IoT terminal and an eMTC terminal to utilize uplink physical resource blocks more efficiently.

According to an embodiment in one aspect of the present disclosure, there is provided a method for allocating an uplink resource in a communication system, comprising:

a. configuring a first resource block for a NB-IoT terminal and a second resource block for an eMTC terminal;

b. scheduling the NB-IoT terminal and the eMTC terminal to commonly use the first resource block and the second resource block.

According to an embodiment in another aspect of the present disclosure, there is provided an apparatus for allocating an uplink resource in a communication system, comprising:

a resource configuration apparatus configured to configure a first resource block for a NB-IoT terminal and a second resource block for an eMTC terminal;

a scheduling apparatus configured to schedule the NB-IoT terminal and the eMTC terminal to commonly use the first resource block and the second resource block.

According to an embodiment in a third aspect of the present disclosure, there is provided a network device in a communication system, the network device comprising the apparatus for allocating an uplink resource mentioned above.

Compared with the prior art, the method and apparatus according to the embodiments of the present disclosure have the following advantages: by providing the method and apparatus for allocating an uplink resource, the NB-IoT terminal and the eMTC terminal may be scheduled to commonly use the uplink physical resource block configured to the NB-IoT terminal and the uplink physical resource block configured to the eMTC terminal, such that the utilization of the uplink frequency is enhanced and an uplink capacity of the cell is also improved, while guaranteeing normal operation of the cell network.

BRIEF DESCRIPTION OF THE DRAWINGS

The present disclosure will be understood more comprehensively through detailed description and drawings below, wherein.

It should be noted that these drawings are meant to illustrate general characteristics of the method and structure utilized in certain exemplary embodiments and to make a supplementation to a written description provided hereinafter. However, these drawings are not provided in scale and might not accurately reflect precise structure or performance characteristics of any given embodiment, such that they should not be construed as defining or limiting the scopes of numerical values or attributes covered by exemplary embodiments. Throughout the drawings, like or exactly identical reference numerals are meant to indicate presence of like or exactly identical units or features.

DETAILED DESCRIPTION OF EMBODIMENTS

Hereinafter, the present disclosure will be described in further detail with reference to the accompanying drawings.

Figure 1:
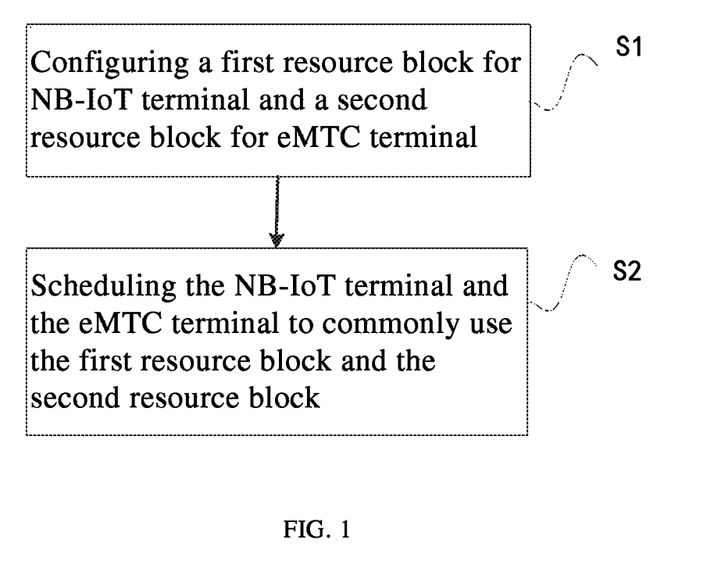
FIG. 1 is a flow diagram illustrating a method for allocating an uplink resource in a communication system according to an embodiment in one aspect of the present disclosure.

FIG. 1 illustrates a flow diagram of a method for allocating an uplink resource in a communication system according to an embodiment in one aspect of the present disclosure.

The method in this embodiment is implemented through an LTE base station or network device. The term "base station" here may be regarded as synonymous to and sometimes referred to as the following: Node B, evolved Node B, transceiver base station (BTS), radio network controller RNC, etc., and may be described as a transceiver that may communicate with a mobile terminal in a wireless communication network across multiple technological generations and provide radio resources thereto. Besides the capability of implementing the method discussed here, the base station described herein may have all functions associated with traditional well-known base station. It needs to be noted that the base stations above are only exemplary, and other existing or future possibly emerging base stations, if applicable to the present disclosure, should also be included within the protection scope of the present disclosure, which are incorporated here by reference.

The method in this embodiment comprises step S1 and step S2. In step S1, the base station configures a first resource block for a NB-IoT terminal and a second resource block for an eMTC terminal. In this embodiment, NB-IoT terminals may be various kinds of objects or UEs (User Equipment) with an information sensor. Such objects or UEs may meet the requirements on NB-IoT terminal accessed to the base station in the 3GPP protocol, and connect to the base station for information exchange and communication. eMTC terminals may be various objects or UEs satisfying the definition of CAT-M Type terminal in the 3GPP protocol. Such objects that can be connected to the base station may be any object connectable or accessible to a cellular network in an IOT network, e.g., an ammeter, a sensing door or window, a lamp and the like, which can be accessed to the cellular network; the UE includes, but not limited to, a PC, a tablet computer, a smart phone, a PDA, etc. It needs to be noted that the NB-IoT terminal and the eMTC terminal above are only examples, and other existing or future possibly emerging NB-IoT terminal and eMTC terminal, if applicable to the present disclosure, should also be included within the protection scope of the present disclosure, which are incorporated herein by reference.

The "NB-IoT terminal" mentioned herein generally refers to one or more such terminals, not particularly referring to a single such terminal (unless specifically illustrated); likewise, the "eMTC terminal" generally refers to one or more such terminals, not particularly referring to a single such terminal (unless particularly illustrated).

The first resource block in step S1 refers to an uplink physical resource block (PRB) configured by the base station for the NB-IoT terminal to use. The second resource block refers to an uplink physical resource block configured by the base station for eMTC terminal to use. The base station will broadcast and transmit, in a cell, information about the first resource block used for configuring the NB-IoT terminal and information about the second resource block used for configuring the eMTC terminal. Allocations of the first resource block and the second resource block should both meet the specifications in the 3GPP protocol. The first resource block and the second resource block may be mutually independent and irrelevant uplink physical resource blocks. In one example, the uplink frequency band width of the cell is 10 MHz, i.e., there are 50 PRBs in the uplink, numbered as PRB0~PRB49. The base station may configure the PRB 45 therein as the first resource block, i.e., the PRB 45 is an uplink physical resource block configured for the NB-IoT terminal to use, and the base station configures 6 PRBs from PRB37~PRB42 as the second resource block, i.e., the PRB 37~42 are uplink physical resource blocks configured for the eMTC terminal to use; there are no overlapping between PRBs 37~42 and PRB 45. The first resource block and the second resource block may also be mutually overlapping uplink physical resource blocks. The base station may configure PRB 42 and PRB 43 in the PRB 0~PRB 49 as the first resource block, while configure PRB 37~PRB 42 as the second resource block, i.e., the PRB 42 is included in both of the first resource block and the second resource block.

In one preferred embodiment, the base station determines a part of the second resource block as a shared resource group in the first resource block. Specifically, among the uplink physical resource blocks configured by the base station for the eMTC terminal to use, some uplink physical resource blocks are configured for the NB-IoT terminal to use, and this part of uplink physical resource blocks constitute a shared resource group. In other words, the shared resource group includes mutually overlapping uplink physical resource blocks among the uplink physical blocks configured by the base station for the eMTC terminal and the uplink resource blocks configured by the base station for the NB-IoT terminal. The shared resource group may be regarded as an uplink physical resource block configured by the base station for both the NB-IoT terminal and the eMTC terminal for common use. The shared resource group may only include 1 PRB (one NB-IoT carrier) or may include more PRBs (a plurality of NB-IoT carriers). These PRBs are generally bandwidth continuous, but may also be bandwidth discontinuous. For example, the base station configures PRB 37~PRB 42 as the second resource block, and PRB 41~PRB42 in the second resource block as the PRBs in the first resource block; then the shared resource group includes PRB 41 and PRB 42.

In step S2, the base station schedules the NB-IoT terminal and the eMTC terminal to commonly use the first resource block and the second resource block. Specifically, when no overlapping PRBs exist between the first resource block and the second resource block, the base station schedules to transmit the uplink data of the NB-IoT terminal on a PRB in the first resource block and schedules to transmit the uplink data of the eMTC terminal on a PRB in the second resource block. In the case of presence of a shared resource group, the base station schedules the NB-IoT terminal and the eMTC terminal to commonly use a PRB in the shared resource group as the PRB in the shared resource group is shared by the NB-IoT terminal and the eMTC terminal.

There are a plurality of modes for the NB-IoT terminal and the eMTC terminal to share a PRB(s). For example:

1) fixed PRB-allocation mode: the base station allocates the NB-IoT terminal to fixedly use one or more PRBs therein, while allocates the eMTC terminal to fixedly use other PRB(s).

2) Time-dimension sharing: the base station allocates the NB-IoT terminal and the eMTC terminal to use these PRBs in different time periods. In an LTE communication system, the resource allocation is performed according to subframes. Therefore, the NB-IoT terminal and the eMTC terminal may use these PRBs in different subframes of time ranges.

3) Spatial-dimension sharing: in the wireless communication system, applications of smart antenna and MIMO (Multiple-Input Multiple-Output) technologies enable terminals in different spaces or different wireless environments to share the same PRB resource for radio data transmission at the same time.

Additionally, sharing of the uplink resource blocks may also be a hybrid sharing mode in terms of time dimension, space dimension, and PRB resources.

In a preferred embodiment, the method of the present disclosure further comprises step S3 (not shown in the figure): the base station schedules terminal of other type (including, but not limited to, an LTE terminal of other type) to use resources unused in the first resource block and the second resource block. The LTE terminal of other type refers to an LTE terminal other than the NB-IoT terminal and the CAT-M type terminal. The uplink PRB resources that may be used by such LTE terminal of other type have a relatively large scope, usually the entire or partial scope of the uplink frequency band of the cell, including the first resource block and the second resource block. In step S3, the resource in the first resource block not scheduled for the NB-IoT terminal to use and the resource in the second resource block not scheduled for the eMTC terminal to use may be used by the LTE terminal of other type, thereby enhancing utilization of uplink PRB resources. For example, the base station configures PRB 37~PRB 42 as the second resource block, available for the eMTC terminal to use. When the base station schedules the eMTC terminal for uplink data transmission, data transmission of all current eMTC terminal is completed using the PRB resources within only 5 ms in each scheduling period (e.g., 20 ms); as a result, the PRB resources (i.e., PRB37~42) within the remaining 15 ms may be used by the LTE terminal of other type to transmit uplink data. For another example, the base station configures PRB43 and PRB44 as the first resource block available for the NB-IoT terminal to use. If the NB-IoT terminal has no data for transmission on the PRB 43 within the current scheduling period, then the PRB43 may be available for the LTE terminal of other type to transmit uplink data.

In a preferred embodiment, step S2 includes step S21 and step S22. In step S21, the base station allocates $M_1$ consecutive subframes in every $N_1$ subframes in the first resource block to the NB-IoT terminal, wherein $M_1$ and $N_1$ are natural numbers. Specifically, every $N_1$ subframes may form a period; within a time of $N_1$ subframes, a time segment including $M_1$ consecutive subframes are taken, the NB-IoT terminal is scheduled to transmit data in the $M_1$ consecutive subframes. The $M_1$ consecutive subframes may be located at any positions in the $N_1$ period. The M1 subframes bear a NB-IOT Physical Random Access Channel (NPRACH) and a NB-IOT Physical Uplink Shared Channel (NPUSCH) to transmit uplink data of the NB-IoT terminal. The value of a N1 and the initial position of the period may be determined by the base station based on its own scheduling policy and scheduling plan; there is a reference default value, and the reference default value is adjustable. If the first resource block contains a plurality of PRBs, $N_1$ and $M_1$ may be simultaneously applied to a plurality of PRBs.

In step S22, the remaining $N_1$-$M_1$ subframes in the shared resource group are allocated to the eMTC terminal. If the PRBs included in the first resource block and the PRBs in the second resource block are overlapping (i.e., the PRBs in the shared resource group), the PRBs in the second resource block may also be available for the eMTC terminal to use; therefore, after scheduling the NB-IoT terminal in $M_1$ subframes according to step S21, the NB-IoT terminal will not be scheduled any more to use the PRB resources in the time period of the remaining $N_1$-$M_1$ subframes in the shared resource group, which are instead allocated for the eMTC terminal to use.

In another preferred embodiment, step S2 further comprises re-determining a value of $M_1$ according to a load of the NB-IoT terminal. The load of the NB-IoT terminal refers to a cellular network's capability to transmit data for the NB-IoT terminal, including at least one of: NB-IoT data schedule wait time of the NB-IoT terminal; number of the NB-IoT terminals waiting for being scheduled; utilization ratio of NPRACH; and the NB-IoT terminal's utilization of the uplink physical resource block. The NB-IoT terminals' to-be-uploaded NB-IoT data are all stored in data memories of respective terminals; therefore, the load of the NB-IoT terminal in the current cellular network may be represented by the NB-IoT data schedule wait time in the memory, or the number of NB-IoT terminals waiting for being scheduled. Increase of any terminal of the NB-IoT data schedule wait time in the memory or increase of the number of NB-IoT terminals waiting for being scheduled is regarded as increase of the NB-IoT terminal's load; while decrease of the longest NB-IoT data schedule wait time in the memory or decrease of the number of NB-IoT terminals waiting for being scheduled is regarded as decrease of the NB-IoT terminal's load. Utilization ratio of the NPRACH may also represent the NB-IoT terminal's load; the higher the utilization ratio of NPRACH channel, the more data are to be uploaded by the NB-IoT terminal, and the higher the NB-IoT terminal's load is; otherwise, low utilization ratio of the NPRACH channel indicates the low load of the NB-IoT terminal. The NB-IoT terminal's utilization of the uplink resource block is also a similar case. A larger number of the uplink physical resource blocks used by the NB-IoT terminal or a higher use frequency signifies a higher load; a lower number of the uplink physical resource block used or a lower use frequency signifies a lower load.

When the NB-IoT terminal's load changes, the value of $M_1$ needs to be re-determined so as to satisfy the NB-IoT terminal's data transmission needs. When the NB-IoT terminal's load increases, the value of $M_1$ may be up adjusted; when the NB-IoT terminal's load decreases, the value of $M_1$ may be down adjusted. The modes of adjusting the $M_1$ value based on the load also include a mode of adjusting the M1 value by step according to the NB-IoT terminal's load change: determining an initial NB-IoT load value, an initial $M_1$ value, and the $M_1$ step; when increase of the NB-IoT load exceeds a NB-IoT load high threshold value 1, the $M_1$ value increases by 1 $M_1$ step compared with the initial $M_1$; when the NB-IoT load increase exceeds a NB-IoT load high threshold value 2, the $M_1$ value increases by 2 $M_1$ step, . . . , the $M_1$ value is held when increasing to a maximum value; when the NB-IoT load is lower than a NB-IoT load low threshold value 1, the $M_1$ value decreases by 1 $M_1$ step; when the NB-IoT load is lower than a NB-IoT load low threshold value 2, the $M_1$ value decreases by 2 $M_1$ steps, . . . , the $M_1$ value is held when decreasing to a minimum value, wherein the NB-IoT load high threshold value k> . . . >NB-IoT load high threshold value 2>NB-IoT load high threshold value 1; the NB-IoT load low threshold value k< . . . <NB-IoT load low threshold value 2<NB-IoT load low threshold value 1; the value of $M_1$ step is configurable. The $M_1$ value to the utmost is no greater than the $N_1$ value, and the $M_1$ value may be set to be larger than a minimum value in use. For example, the base station adjusts the $M_1$ value according to step based on the NB-IoT terminal's load change, $N_1$=40, the initial value of $M_1$ being 18, the minimum value of $M_1$ being 10, and the $M_1$ step being 8; the NB-IoT terminal's data schedule wait time in the memories is used as a measurement index for the NB-IoT terminal's load, the measurement period of the wait time is 2048 ms, and the initial value of the wait time is 512 ms. When any NB-IoT terminal's data wait time within one measurement period (2048 ms) exceeds 768 ms (i.e., the NB-IoT load high threshold 1), the $M_1$ value increases by one $M_1$ step, changed to be 26; when any NB-IoT terminal's data wait time within one measurement period exceeds 1024 ms (i.e., the NB-IoT load high threshold 2), the $M_1$ value is changed to be 34; when any NB-IoT terminal's data wait time within one measurement period exceeds 1200 ms (i.e., the NB-IoT load high threshold 3), the $M_1$ value is the maximum value 40. Similarly, when the longest wait time among all NB-IoT terminals' data schedule wait time within the 2048 s measurement period is less than 300 ms (i.e., the NB-IoT load low threshold 1), the $M_1$ is decreased to be the minimum value 10. For another example, under the conditions of the examples above, utilization of the random access channel of the NB-IoT terminal is in turn used as the measurement index of load, where the initial default value of NPRACH channel utilization is 40%. When the NPRACH channel utilization is greater than 50%, the $M_1$ value increases by one $M_1$ step, and then $M_1$ is changed to be 26; when the NPRACH channel utilization is greater than 60%, the $M_1$ value changes to be 34; when the NPRACH utilization is greater than 70%, the $M_1$ value is the maximum value 40. Similarly, when the NPRACH channel utilization is less than 30%, the M1 value decreases to be the minimum value 10.

The mode of adjusting the $M_1$ value based on load includes a mode of adjusting $M_1$ using different reference default values according to load changes of the NB-IoT terminal. In other words, when the load changes to a different load threshold condition, different reference default values are employed to determine the $M_1$ value. The respective reference default values are configurable. Those skilled in the art may easily know the mode of adjusting $M_1$ using different reference default values according to load changes of the NB-IoT terminal based on the above description on "the mode of changing the $M_1$ value by step according to load changes of the NB-IoT terminal", which is thus not detailed here.

In a further preferred embodiment of the present disclosure, the step S2 comprises: scheduling an eMTC terminal in a non-shared resource group other than the shared resource group in the second resource block. The second resource block includes a shared resource group and a non-shared resource group. The shared resource group includes PRB(s) mutually overlapping in the first resource block and the second resource block, while the non-shared resource group includes PRB(s) in the second resource block configured only for the eMTC terminal to use, including the PRBs other than those in the shared resource group in the second resource block. For example, the first resource block configured by the base station for the NB-IoT terminal to use is PRB 42, and the second resource block configured for the eMTC terminal to use includes PRBs 37~42; then the PRB included in the shared resource group is PRB 42, and the PRBs included in the non-shared resource group are PRB 37~41.

In the preferred embodiment, the base station schedules the eMTC terminal on the non-shared resource group, i.e., the base station schedules the eMTC terminal to use PRBs in the non-shared resource group to transmit uplink data. PRB uplink resources may be scaled in time dimension and spatial dimension to use; therefore, there exist a plurality of modes of scheduling the PRBs scheduled for the eMTC terminal to use. The base station may only schedule the eMTC terminal to use the non-shared resource group, without scheduling an LTE terminal of other type to use the non-shared resource group. At this point, based on data transmission needs of the current eMTC terminal, the base station schedules data of all current eMTC terminals to be sent out as soon as possible according to a priority order. In this case, multiplexing of the PRB(s) in the non-shared resource group between the eMTC terminal and the LTE terminal of other type will not be considered. While scheduling the eMTC terminal to use the non-shared resource group, the base station may also consider scheduling the LTE terminal of other type to multiplex the non-shared resource group. The multiplexing mode includes multiplexing of dimensions, such as frequency dimension, time dimension, spatial dimension, etc.

Preferably, the step of scheduling the eMTC terminal in the non-shared resource group comprises: allocating $M_2$ consecutive subframes in every $N_2$ subframes in the non-shared resource group to the eMTC terminal for use, where $M_2$ and $N_2$ are natural numbers; and not allocating remaining $N_2$-$M_2$ subframes in the non-shared resource group to the eMTC terminal for use. Specifically, the $N_2$ subframes may constitute a time period; within the time period of $N_2$ subframes, a time segment including $M_2$ consecutive subframes are taken, the eMTC terminal are all scheduled on the $M_2$ consecutive subframes. The M2 consecutive subframes may be located at any positions in the $N_2$ period. The base station schedules the eMTC terminal to transmit uplink data using the PRB resources within the $M_2$ subframe time period according to protocol requirements. The value of $N_2$ and the initial position of the period may be determined by the base station based on its own scheduling policy and scheduling plan; there is a reference default value, and the reference default value is adjustable. If the non-shared resource group includes a plurality of PRBs, the $N_2$ and $M_2$ may be simultaneously applied to a plurality of PRBs. The remaining $N_2$-$M_2$ subframes in the non-shared resource group are not allocated to the eMTC terminal to use; in this way, the PRB resources within the remaining N2-M2 subframe time will be free, thereby facilitating scheduling the LTE terminal of other type to use these resources, which also enhances utilization of the uplink frequency resource.

Preferably, in the non-shared resource group, the step of scheduling the eMTC terminal further comprises: re-determining a value of M2 according to a load of the eMTC terminal. The load of the eMTC terminal refers to a cellular network's capability to transmit data for the eMTC terminal, including at least one of: data schedule wait time of the eMTC terminal; number of the eMTC terminals waiting for being scheduled; utilization ratio of eMTC random access channel; and the eMTC terminal's utilization of the uplink physical resource block. The eMTC terminals' to-be-uploaded eMTC data are all stored in data memories of respective terminals; therefore, the load of the eMTC terminal in the current cellular network may be represented by the data schedule wait time in the memory, or the number of eMTC terminals waiting for being scheduled. Increase of any terminal of the eMTC data schedule wait time in the memory or increase of the number of eMTC terminals waiting for being scheduled is regarded as increase of the eMTC terminal's load; while decrease of the longest eMTC data schedule wait time in the memory or decrease of the number of eMTC terminals waiting for being scheduled is regarded as decrease of the eMTC terminal's load. Utilization ratio of the eMTC random access channel may also represent the eMTC terminal's load: the higher the utilization ratio of eMTC random access channel, the more data are to be uploaded by the eMTC terminal, and the higher the eMTC terminal's load is; otherwise, low utilization ratio of the eMTC random access channel indicates the low load of the eMTC terminal. The eMTC terminal's utilization of the uplink resource block is also a similar case. A larger number of the uplink physical resource blocks used by the eMTC terminal or a higher use frequency signifies a higher load; a lower number of the uplink physical resource block used or a lower use frequency signifies a lower load.

When the eMTC terminal's load changes, the value of $M_2$ needs to be re-determined so as to satisfy the eMTC terminal's data transmission needs. When the eMTC terminal's load increases, the value of $M_2$ may be up adjusted; when the eMTC terminal's load decreases, the value of $M_2$ may be down adjusted. The modes of adjusting the $M_2$ value based on the load also include a mode of adjusting the $M_2$ value by step according to the eMTC terminal's load change: setting an initial eMTC load value and an initial $M_2$ value; when increase of the eMTC load exceeds an eMTC load high threshold value 1, the $M_2$ value increases by 1 $M_2$ step compared with the initial $M_2$; when the eMTC load increase exceeds an eMTC load high threshold value 2, the $M_2$ value increases by 2 $M_2$ step, . . . , the $M_2$ value is held when increasing to a maximum value; when the eMTC load is lower than an eMTC load low threshold value 1, the $M_2$ value decreases by 1 $M_2$ step; when the eMTC load is lower than an eMTC load low threshold value 2, the $M_2$ value decreases by 2 $M_2$ steps, . . . , the $M_2$ value is held when decreasing to a minimum value, wherein the eMTC load high threshold value k> . . . >eMTC load high threshold value 2>eMTC load high threshold value 1; the eMTC load low threshold value k< . . . <eMTC load low threshold value 2<eMTC load low threshold value 1; the value of $M_2$ step is configurable. The $M_2$ value to the utmost is no greater than the $N_2$ value, and the $M_2$ value may be set to be larger than a minimum value in use. For example, the base station adjusts the $M_2$ value according to step based on the eMTC terminal's load change, $N_2$=40, the initial value of $M_2$ being 20, the minimum value of $M_2$ being 10, and the $M_2$ step being 10; the eMTC terminal's data schedule wait time in the memories is used as a measurement index for the eMTC terminal's load, the measurement period of the wait time is 4096 ms, and the initial value of the wait time is 2048 ms. When any eMTC terminal's data wait time within one measurement period (4096 ms) exceeds 2560 ms (i.e., the eMTC load high threshold 1), the $M_2$ value increases by one $M_2$ step, changed to be 30; when any eMTC terminal's data wait time within one measurement period exceeds 3072 ms (i.e., the eMTC load high threshold 2), the $M_2$ value is the maximum value 40. Similarly, when the longest wait time among all eMTC terminals' data schedule wait time within the 4096 ms measurement period is less than 512 ms (i.e., the eMTC load low threshold 1), the $M_2$ is decreased to be the minimum value 10.

The mode of adjusting the $M_2$ value based on load includes a mode of adjusting $M_2$ using different reference default values according to load changes of the eMTC terminal. In other words, when the load changes to a different load threshold condition, different reference default values are employed to determine the $M_2$ value. The respective reference default values are configurable. Those skilled in the art may easily know the mode of adjusting $M_2$ using different reference default values according to load changes of the eMTC terminal based on the above description on "the mode of changing the $M_2$ value by step according to load changes of the eMTC terminal", which is thus not detailed here.

Figure 2:
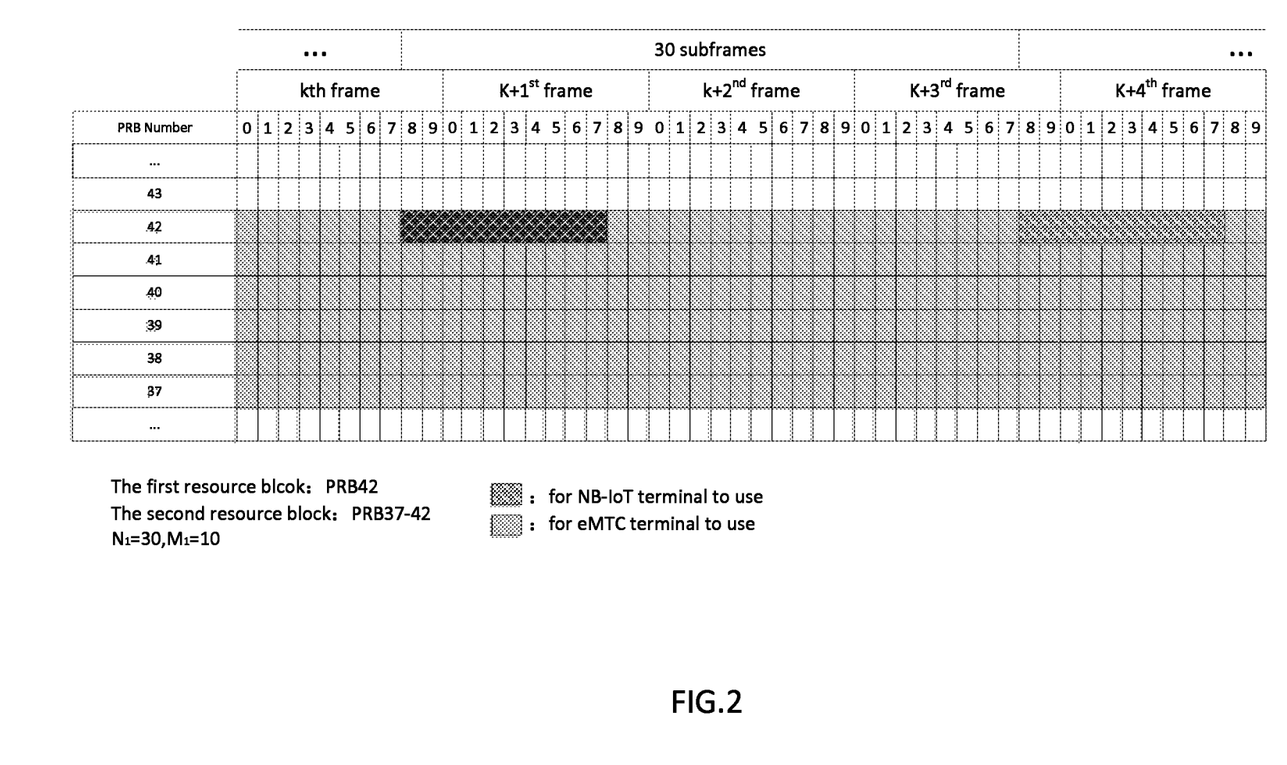
FIG. 2 is a diagram illustrating uplink resource allocation according to an exemplary embodiment of the present disclosure.

FIG. 2 is a diagram illustrating uplink resource allocation according to an exemplary embodiment of the present disclosure. In the figure, the base station configures PRB42 as a first resource block for the NB-IoT terminal to use, and the PRB 37~42 as the second resource block for the eMTC terminal to use; therefore, the PRB included in the shared resource group is PRB42. $N_1$=30, which means taking 30 ms as a repetition time period. The 30 ms period window shown in the figure ranges from the $8^{th}$ subframe of the $k^{th}$ subframe to the $7^{th}$ subframe of the $k+2^{nd}$ frame. $M_1$=10, indicating the time range of 10 subframes. In PRB42, the base station takes the $8^{th}$ subframe of the $k^{th}$ frame to the $7^{th}$ subframe of the $k+1^{st}$ subframe (10 subframes in total) as $M_1$ consecutive subframes to schedule the NB-IoT terminal in the 10 subframes, while within the time period from the $8^{th}$ subframe of the $k+1^{st}$ frame to the $7^{th}$ subframe of the $k+3^{rd}$ frame left in the 30 ms period window on PRB42, the base station will not schedule the NB-IoT terminal, because these resources may be reserved for the eMTC terminal to use.

Figure 3:
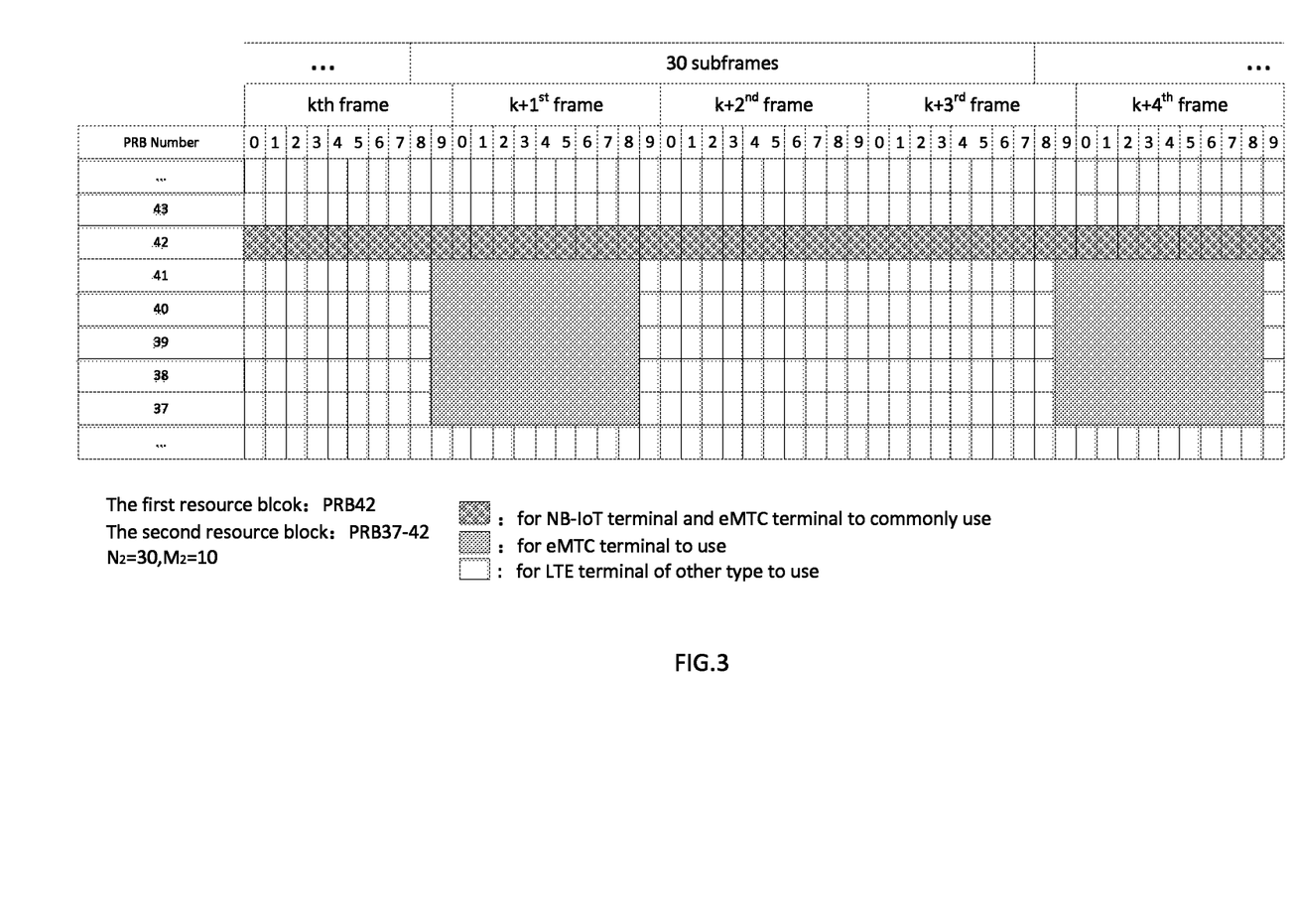
FIG. 3 is a diagram illustrating uplink resource allocation according to another exemplary embodiment of the present disclosure.

FIG. 3 is a diagram illustrating uplink resource allocation according to another exemplary embodiment of the present disclosure. In the figure, the base station configures PRB42 as the first resource block for the NB-IoT terminal to use, and PRB37~42 as the second resource block for the eMTC terminal to use; therefore, the PRB included in the shared resource group is PRB42, and the NB-IoT terminal and the eMTC terminal commonly use the PRB42 resource. $N_2$=30, which means taking 30 ms as a repetition time period. The 30 ms period window shown in the figure ranges from the $9^{th}$ subframe of the $k^{th}$ subframe to the $8^{th}$ subframe of the $k+2^{nd}$ frame. $M_2$=10, indicating the time range of 10 subframes. In PRBs 37~41, the base station takes the $9^{th}$ subframe of the $k^{th}$ frame to the $8^{th}$ subframe of the $k+1^{st}$ subframe (10 subframes in total) as $M_2$ consecutive subframes to schedule the eMTC terminal in the 10 subframes, while within the time period from the $9^{th}$ subframe of the $k+1^{st}$ frame to the $8^{th}$ subframe of the $k+3^{rd}$ frame left in the 30 ms period window on PRBs 37~41, the base station will not schedule the eMTC terminal, because these resources may be reserved for the LTE terminal of other type to use.

Figure 4:
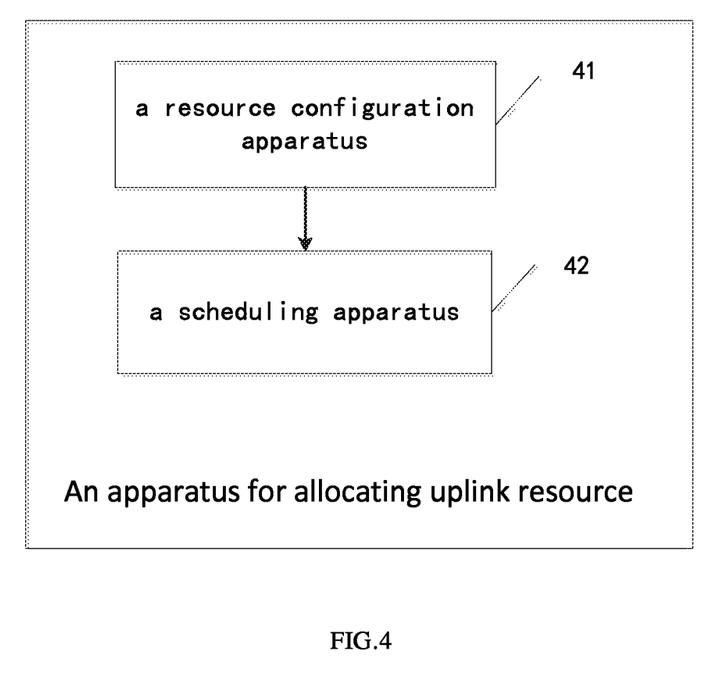
FIG. 4 is a schematic block diagram of an apparatus for allocating an uplink resource in a communication system according to another aspect of the present disclosure.

FIG. 4 illustrates a schematic block diagram of an apparatus for allocating an uplink resource in a communication system according to an embodiment in another aspect of the present disclosure.

The apparatus in this embodiment is implemented through an LTE base station or network device. The term "base station" here may be regarded as synonymous to and sometimes referred to as the following: Node B, evolved Node B, transceiver base station (BTS), radio network controller RNC, etc., and may be described as a transceiver that may communicate with a mobile terminal in a wireless communication network across multiple technological generations and provide radio resources thereto. Besides the capability of implementing the apparatus discussed here, the base station described herein may have all functions associated with traditional well-known base station. It needs to be noted that the base stations above are only exemplary, and other existing or future possibly emerging base stations, if applicable to the present disclosure, should also be included within the protection scope of the present disclosure, which are incorporated here by reference.

The apparatus in this embodiment comprises a resource configuration apparatus 41 and a scheduling apparatus 42. The resource configuration apparatus 31, configured to configure a first resource block for a NB-IoT terminal and a second resource block for an eMTC terminal. In this embodiment, NB-IoT terminals may be various kinds of objects or UEs (User Equipment) with an information sensor. Such objects or UEs may meet the requirements on NB-IoT terminal accessed to the base station in the 3GPP protocol, and connect to the base station for information exchange and communication. eMTC terminals may be various objects or UEs satisfying the definition of CAT-M Type terminal in the 3GPP protocol. Such objects that can be connected to the base station may be any object connectable or accessible to a cellular network in an IOT network, e.g., an ammeter, a sensing door or window, a lamp and the like, which can be accessed to the cellular network; the UE includes, but not limited to, a PC, a tablet computer, a smart phone, a PDA, etc. It needs to be noted that the NB-IoT terminal and the eMTC terminal above are only examples, and other existing or future possibly emerging NB-IoT terminal and eMTC terminal, if applicable to the present disclosure, should also be included within the protection scope of the present disclosure, which are incorporated herein by reference.

The "NB-IoT terminal" mentioned herein generally refers to one or more such terminals, not particularly referring to a single such terminal (unless specifically illustrated); likewise, the "eMTC terminal" generally refers to one or more such terminals, not particularly referring to a single such terminal (unless particularly illustrated).

In the resource configuration apparatus 41, the first resource block refers to an uplink physical resource block (PRB) configured for the NB-IoT terminal to use. The second resource block refers to an uplink physical resource block for eMTC terminal to use. The base station will broadcast and transmit, in a cell, information about the first resource block used for configuring the NB-IoT terminal and information about the second resource block used for configuring the eMTC terminal. Allocations of the first resource block and the second resource block should both meet the specifications in the 3GPP protocol. The first resource block and the second resource block may be mutually independent and irrelevant uplink physical resource blocks. In one example, the uplink frequency band width of the cell is 10 MHz, i.e., there are 50 PRBs in the uplink, numbered as PRB0~PRB49. The resource configuration apparatus 41 may configure the PRB 45 therein as the first resource block, i.e., the PRB 45 is an uplink physical resource block configured for the NB-IoT terminal to use, and the resource configuration apparatus 41 configures 6 PRBs from PRB37~PRB42 as the second resource block, i.e., the PRB 37~42 are uplink physical resource blocks configured for the eMTC terminal to use; there are no overlapping between PRBs 37~42 and PRB 45. The first resource block and the second resource block may also be mutually overlapping uplink physical resource blocks. The resource configuration apparatus 41 may configure PRB 42 and PRB 43 in the PRB 0 ~PRB 49 as the first resource block, while configure PRB 37~PRB 42 as the second resource block, i.e., the PRB 42 is included in both of the first resource block and the second resource block.

In one preferred embodiment, the resource configuration apparatus 41 comprises a shared resource configuration module 411, which configured to determine a part of the second resource block as a shared resource group in the first resource block. Specifically, among the uplink physical resource blocks for the eMTC terminal to use, the shared resource configuration module 411 configures some uplink physical resource blocks for the NB-IoT terminal to use, and this part of uplink physical resource blocks constitute a shared resource group. In other words, the shared resource group includes mutually overlapping uplink physical resource blocks among the uplink physical blocks configured for the eMTC terminal and the uplink resource blocks configured for the NB-IoT terminal. The shared resource group may be regarded as an uplink physical resource block configured for both the NB-IoT terminal and the eMTC terminal for common use. The shared resource group may only include 1 PRB (one NB-IoT carrier) or may include more PRBs (a plurality of NB-IoT carriers). These PRBs are generally bandwidth continuous, but may also be bandwidth discontinuous. For example, the resource configuration apparatus 41 configures PRB 37~PRB 42 as the second resource block, and the shared resource configuration module 411 configures PRB 41~PRB42 in the second resource block as the PRBs in the first resource block; then the shared resource group includes PRB 41 and PRB 42.

The scheduling apparatus 42 is configured to schedule the NB-IoT terminal and the eMTC terminal to commonly use the first resource block and the second resource block. Specifically, when no overlapping PRBs exist between the first resource block and the second resource block, the scheduling apparatus 42 schedules to transmit the uplink data of the NB-IoT terminal on a PRB in the first resource block and schedules to transmit the uplink data of the eMTC terminal on a PRB in the second resource block. In the case of presence of a shared resource group, the scheduling apparatus 42 schedules the NB-IoT terminal and the eMTC terminal to commonly use a PRB in the shared resource group as the PRB in the shared resource group is shared by the NB-IoT terminal and the eMTC terminal.

There are a plurality of modes for the NB-IoT terminal and the eMTC terminal to share a PRB(s). For example:

1) fixed PRB-allocation mode: the scheduling apparatus 42 allocates the NB-IoT terminal to fixedly use one or more PRBs therein, while allocates the eMTC terminal to fixedly use other PRB(s).

2) Time-dimension sharing: the scheduling apparatus 42 allocates the NB-IoT terminal and the eMTC terminal to use these PRBs in different time periods. In an LTE communication system, the resource allocation is performed according to subframes. Therefore, the NB-IoT terminal and the eMTC terminal may use these PRBs in different subframes of time ranges.

3) Spatial-dimension sharing: in the wireless communication system, applications of smart antenna and MIMO (Multiple-Input Multiple-Output) technologies enable terminals in different spaces or different wireless environments to share the same PRB resource for radio data transmission at the same time.

Additionally, sharing of the uplink resource blocks may also be a hybrid sharing mode in terms of time dimension, space dimension, and PRB resources.

In a preferred embodiment, the apparatus for allocating uplink resource of the present disclosure further comprises a remaining resource scheduling apparatus 43 (not shown in the figure): configured to schedule remaining unused resource in the first resource block and the second resource block to LTE terminal of other type (including, but no limited to, LTE terminal of other type). The LTE terminal of other type refers to an LTE terminal other than the NB-IoT terminal and the CAT-M type terminal. The uplink PRB resources that may be used by such LTE terminal of other type have a relatively large scope, usually the entire or partial scope of the uplink frequency band of the cell, including the first resource block and the second resource block. In the remaining resource scheduling apparatus 43, the resource in the first resource block not scheduled for the NB-IoT terminal to use and the resource in the second resource block not scheduled for the eMTC terminal to use may be used by the LTE terminal of other type, thereby enhancing utilization of uplink PRB resources. For example, the resource configuration apparatus 41 configures PRB 37~PRB 42 as the second resource block, available for the eMTC terminal to use. When the scheduling apparatus 42 schedules the eMTC terminal for uplink data transmission, data transmission of all current eMTC terminal is completed using the PRB resources within only 5 ms in each scheduling period (e.g., 20 ms); as a result, the PRB resources (i.e., PRB37~42) within the remaining 15 ms may be used by the LTE terminal of other type to transmit uplink data. For another example, the resource configuration apparatus 41 configures PRB43 and PRB44 as the first resource block available for the NB-IoT terminal to use. If the NB-IoT terminal has no data for transmission on the PRB 43 within the current scheduling period, then the PRB43 may be available for the LTE terminal of other type to transmit uplink data.

In a preferred embodiment, the scheduling apparatus 42 comprises a first subframe allocating module 421 and a first remaining subframe allocating module 422. The first subframe allocating module 421 is configured to allocate $M_1$ consecutive subframes in every $N_1$ subframes in the first resource block to the NB-IoT terminal, wherein $M_1$ and $N_1$ are natural numbers. Specifically, every $N_1$ subframes may form a period; within a time of $N_1$ subframes, a time segment including $M_1$ consecutive subframes are taken, the NB-IoT terminal is scheduled to transmit data in the $M_1$ consecutive subframes. The $M_1$ consecutive subframes may be located at any positions in the $N_1$ period. The M1 subframes bear a NB-IOT Physical Random Access Channel (NPRACH) and a NB-IOT Physical Uplink Shared Channel (NPUSCH) to transmit uplink data of the NB-IoT terminal. The value of N1 and the initial position of the period may be determined by the first subframe allocating module 421 based on its own scheduling policy and scheduling plan; there is a reference default value, and the reference default value is adjustable. If the first resource block contains a plurality of PRBs, $N_1$ and $M_1$ may be simultaneously applied to a plurality of PRBs.

The first remaining subframe allocating module 422 is configured to allocate remaining $N_1$-$M_1$ subframes in the shared resource group to the eMTC terminal. If the PRBs included in the first resource block and the PRBs in the second resource block are overlapping (i.e., the PRBs in the shared resource group), the PRBs in the second resource block may also be available for the eMTC terminal to use; therefore, after the first subframe allocating module 421 scheduling the NB-IoT terminal in $M_1$ subframes, the NB-IoT terminal will not be scheduled any more to use the PRB resources in the time period of the remaining $N_1$-$M_1$ subframes in the shared resource group, which are instead allocated for the eMTC terminal to use by the first remaining subframe allocating module 422.

In another preferred embodiment, the scheduling apparatus 42 comprises a first re-determining module 423, configured to re-determine a value of $M_1$ based on a load of the NB-IoT terminal. The load of the NB-IoT terminal refers to a cellular network's capability to transmit data for the NB-IoT terminal, including at least one of: NB-IoT data schedule wait time of the NB-IoT terminal; number of the NB-IoT terminals waiting for being scheduled; utilization ratio of NPRACH; and the NB-IoT terminal's utilization of the uplink physical resource block. The NB-IoT terminals' to-be-uploaded NB-IoT data are all stored in data memories of respective terminals; therefore, the load of the NB-IoT terminal in the current cellular network may be represented by the NB-IoT data schedule wait time in the memory, or the number of NB-IoT terminals waiting for being scheduled. Increase of any terminal of the NB-IoT data schedule wait time in the memory or increase of the number of NB-IoT terminals waiting for being scheduled is regarded as increase of the NB-IoT terminal's load; while decrease of the longest NB-IoT data schedule wait time in the memory or decrease of the number of NB-IoT terminals waiting for being scheduled is regarded as decrease of the NB-IoT terminal's load. Utilization ratio of the NPRACH may also represent the NB-IoT terminal's load; the higher the utilization ratio of NPRACH channel, the more data are to be uploaded by the NB-IoT terminal, and the higher the NB-IoT terminal's load is; otherwise, low utilization ratio of the NPRACH channel indicates the low load of the NB-IoT terminal. The NB-IoT terminal's utilization of the uplink resource block is also a similar case. A larger number of the uplink physical resource blocks used by the NB-IoT terminal or a higher use frequency signifies a higher load; a lower number of the uplink physical resource block used or a lower use frequency signifies a lower load.

When the NB-IoT terminal's load changes, the value of $M_1$ needs to be re-determined by the first re-determining module 423 so as to satisfy the NB-IoT terminal's data transmission needs. When the NB-IoT terminal's load increases, the value of $M_1$ may be up adjusted; when the NB-IoT terminal's load decreases, the value of $M_1$ may be down adjusted. The modes of adjusting the $M_1$ value based on the load also include a mode of adjusting the M1 value by step according to the NB-IoT terminal's load change: determining an initial NB-IoT load value, an initial $M_1$ value, and the $M_1$ step; when increase of the NB-IoT load exceeds a NB-IoT load high threshold value 1, the $M_1$ value increases by 1 $M_1$ step compared with the initial $M_1$; when the NB-IoT load increase exceeds a NB-IoT load high threshold value 2, the $M_1$ value increases by 2 $M_1$ step, . . . , the $M_1$ value is held when increasing to a maximum value; when the NB-IoT load is lower than a NB-IoT load low threshold value 1, the $M_1$ value decreases by 1 $M_1$ step; when the NB-IoT load is lower than a NB-IoT load low threshold value 2, the $M_1$ value decreases by 2 $M_1$ steps, . . . , the $M_1$ value is held when decreasing to a minimum value, wherein the NB-IoT load high threshold value k> . . . >NB-IoT load high threshold value 2>NB-IoT load high threshold value 1; the NB-IoT load low threshold value k< . . . <NB-IoT load low threshold value 2<NB-IoT load low threshold value 1; the value of $M_1$ step is configurable. The $M_1$ value to the utmost is no greater than the $N_1$ value, and the $M_1$ value may be set to be larger than a minimum value in use. For example, the first re-determining module 423 adjusts the $M_1$ value according to step based on the NB-IoT terminal's load change, $N_1$=40, the initial value of $M_1$ being 18, the minimum value of $M_1$ being 10, and the $M_1$ step being 8; the NB-IoT terminal's data schedule wait time in the memories is used as a measurement index for the NB-IoT terminal's load, the measurement period of the wait time is 2048 ms, and the initial value of the wait time is 512 ms. When any NB-IoT terminal's data wait time within one measurement period (2048 ms) exceeds 768 ms (i.e., the NB-IoT load high threshold 1), the $M_1$ value increases by one $M_1$ step, changed to be 26; when any NB-IoT terminal's data wait time within one measurement period exceeds 1024 ms (i.e., the NB-IoT load high threshold 2), the $M_1$ value is changed to be 34; when any NB-IoT terminal's data wait time within one measurement period exceeds 1200 ms (i.e., the NB-IoT load high threshold 3), the $M_1$ value is the maximum value 40. Similarly, when the longest wait time among all NB-IoT terminals' data schedule wait time within the 2048 s measurement period is less than 300 ms (i.e., the NB-IoT load low threshold 1), the $M_1$ is decreased to be the minimum value 10. For another example, under the conditions of the examples above, utilization of the random access channel of the NB-IoT terminal is in turn used as the measurement index of load, where the initial default value of NPRACH channel utilization is 40%. When the NPRACH channel utilization is greater than 50%, the $M_1$ value increases by one $M_1$ step, and then $M_1$ is changed to be 26; when the NPRACH channel utilization is greater than 60%, the $M_1$ value changes to be 34; when the NPRACH utilization is greater than 70%, the $M_1$ value is the maximum value 40. Similarly, when the NPRACH channel utilization is less than 30%, the M1 value decreases to be the minimum value 10.

The mode of adjusting the $M_1$ value based on load includes a mode of adjusting $M_1$ using different reference default values according to load changes of the NB-IoT terminal. In other words, when the load changes to a different load threshold condition, different reference default values are employed to determine the $M_1$ value. The respective reference default values are configurable. Those skilled in the art may easily know the mode of adjusting $M_1$ using different reference default values according to load changes of the NB-IoT terminal based on the above description on "the mode of changing the $M_1$ value by step according to load changes of the NB-IoT terminal", which is thus not detailed here.

In a further preferred embodiment of the present disclosure, the scheduling apparatus 42 comprises a non-shared resource scheduling module 424, which configured to schedule the eMTC terminal in a non-shared resource group other than the shared resource group in the second resource block. The second resource block includes a shared resource group and a non-shared resource group. The shared resource group includes PRB(s) mutually overlapping in the first resource block and the second resource block, while the non-shared resource group includes PRB(s) in the second resource block configured only for the eMTC terminal to use, including the PRBs other than those in the shared resource group in the second resource block. For example, the first resource block configured by the resource configuration apparatus 41 for the NB-IoT terminal to use is PRB 42, and the second resource block configured for the eMTC terminal to use includes PRBs 37~42; then the PRB included in the shared resource group is PRB 42, and the PRBs included in the non-shared resource group are PRB 37~41.

In the preferred embodiment, the non-shared resource scheduling module 424 schedules the eMTC terminal on the non-shared resource group, i.e., schedules the eMTC terminal to use PRBs in the non-shared resource group to transmit uplink data. PRB uplink resources may be scaled in time dimension and spatial dimension to use; therefore, there exist a plurality of modes of scheduling the PRBs scheduled for the eMTC terminal to use. The non-shared resource scheduling module 424 may only schedule the eMTC terminal to use the non-shared resource group, without scheduling an LTE terminal of other type to use the non-shared resource group. At this point, based on data transmission needs of the current eMTC terminal, the non-shared resource scheduling module 424 schedules data of all current eMTC terminals to be sent out as soon as possible according to a priority order. In this case, multiplexing of the PRB(s) in the non-shared resource group between the eMTC terminal and the LTE terminal of other type will not be considered. While scheduling the eMTC terminal to use the non-shared resource group, the non-shared resource scheduling module 424 may also consider scheduling the LTE terminal of other type to multiplex the non-shared resource group. The multiplexing mode includes multiplexing of dimensions, such as frequency dimension, time dimension, spatial dimension, etc.

Preferably, the non-shared resource scheduling module 424 comprises a second subframe allocating unit 4241 and a second remaining subframe allocating unit 4242. The second subframe allocating unit 4241 is configured to allocate $M_2$ consecutive subframes in every $N_2$ subframes in the non-shared resource group to the eMTC terminal for use, where $M_2$ and $N_2$ are natural numbers; the second remaining subframe allocating unit 4242 is configured to not allocate remaining $N_2$-$M_2$ subframes in the non-shared resource group to the eMTC terminal for use. Specifically, the $N_2$ subframes may constitute a time period; within the time period of $N_2$ subframes, a time segment including $M_2$ consecutive subframes are taken, the eMTC terminal are all scheduled on the $M_2$ consecutive subframes. The M2 consecutive subframes may be located at any positions in the $N_2$ period. The second subframe allocating unit 4241 schedules the eMTC terminal to transmit uplink data using the PRB resources within the $M_2$ subframe time period according to protocol requirements. The value of $N_2$ and the initial position of the period may be determined by the second subframe allocating unit 4241 based on its own scheduling policy and scheduling plan; there is a reference default value, and the reference default value is adjustable. If the non-shared resource group includes a plurality of PRBs, the $N_2$ and $M_2$ may be simultaneously applied to a plurality of PRBs. The remaining $N_2$-$M_2$ subframes in the non-shared resource group are not allocated to the eMTC terminal to use; in this way, the PRB resources within the remaining N2-M2 subframe time will be free, thereby facilitating scheduling the LTE terminal of other type to use these resources, which also enhances utilization of the uplink frequency resource.

Preferably, the non-shared resource scheduling module 424 further comprises a second re-determining unit 4243, which is configured to re-determine a value of M2 according to a load of the eMTC terminal. The load of the eMTC terminal refers to a cellular network's capability to transmit data for the eMTC terminal, including at least one of: data schedule wait time of the eMTC terminal; number of the eMTC terminals waiting for being scheduled; utilization ratio of eMTC random access channel; and the eMTC terminal's utilization of the uplink physical resource block. The eMTC terminals' to-be-uploaded eMTC data are all stored in data memories of respective terminals; therefore, the load of the eMTC terminal in the current cellular network may be represented by the data schedule wait time in the memory, or the number of eMTC terminals waiting for being scheduled. Increase of any terminal of the eMTC data schedule wait time in the memory or increase of the number of eMTC terminals waiting for being scheduled is regarded as increase of the eMTC terminal's load; while decrease of the longest eMTC data schedule wait time in the memory or decrease of the number of eMTC terminals waiting for being scheduled is regarded as decrease of the eMTC terminal's load. Utilization ratio of the eMTC random access channel may also represent the eMTC terminal's load: the higher the utilization ratio of eMTC random access channel, the more data are to be uploaded by the eMTC terminal, and the higher the eMTC terminal's load is; otherwise, low utilization ratio of the eMTC random access channel indicates the low load of the eMTC terminal. The eMTC terminal's utilization of the uplink resource block is also a similar case. A larger number of the uplink physical resource blocks used by the eMTC terminal or a higher use frequency signifies a higher load; a lower number of the uplink physical resource block used or a lower use frequency signifies a lower load.

When the eMTC terminal's load changes, the value of $M_2$ needs to be re-determined so as to satisfy the eMTC terminal's data transmission needs. When the eMTC terminal's load increases, the value of $M_2$ may be up adjusted; when the eMTC terminal's load decreases, the value of $M_2$ may be down adjusted. The modes of adjusting the $M_2$ value based on the load also include a mode of adjusting the $M_2$ value by step according to the eMTC terminal's load change: setting an initial eMTC load value and an initial $M_2$ value; when increase of the eMTC load exceeds an eMTC load high threshold value 1, the $M_2$ value increases by 1 $M_2$ step compared with the initial $M_2$; when the eMTC load increase exceeds an eMTC load high threshold value 2, the $M_2$ value increases by 2 $M_2$ step, . . . , the $M_2$ value is held when increasing to a maximum value; when the eMTC load is lower than an eMTC load low threshold value 1, the $M_2$ value decreases by 1 $M_2$ step; when the eMTC load is lower than an eMTC load low threshold value 2, the $M_2$ value decreases by 2 $M_2$ steps, . . . , the $M_2$ value is held when decreasing to a minimum value, wherein the eMTC load high threshold value k> . . . >eMTC load high threshold value 2>eMTC load high threshold value 1; the eMTC load low threshold value k< . . . <eMTC load low threshold value 2<eMTC load low threshold value 1; the value of $M_2$ step is configurable. The $M_2$ value to the utmost is no greater than the $N_2$ value, and the $M_2$ value may be set to be larger than a minimum value in use. For example, the second re-determining unit 4243 adjusts the $M_2$ value according to step based on the eMTC terminal's load change, $N_2$=40, the initial value of $M_2$ being 20, the minimum value of $M_2$ being 10, and the $M_2$ step being 10; the eMTC terminal's data schedule wait time in the memories is used as a measurement index for the eMTC terminal's load, the measurement period of the wait time is 4096 ms, and the initial value of the wait time is 2048 ms. When any eMTC terminal's data wait time within one measurement period (4096 ms) exceeds 2560 ms (i.e., the eMTC load high threshold 1), the $M_2$ value increases by one $M_2$ step, changed to be 30; when any eMTC terminal's data wait time within one measurement period exceeds 3072 ms (i.e., the eMTC load high threshold 2), the $M_2$ value is the maximum value 40. Similarly, when the longest wait time among all eMTC terminals' data schedule wait time within the 4096 ms measurement period is less than 512 ms (i.e., the eMTC load low threshold 1), the $M_2$ is decreased to be the minimum value 10.

The mode of adjusting the $M_2$ value based on load includes a mode of adjusting $M_2$ using different reference default values according to load changes of the eMTC terminal. In other words, when the load changes to a different load threshold condition, different reference default values are employed to determine the $M_2$ value. The respective reference default values are configurable. Those skilled in the art may easily know the mode of adjusting $M_2$ using different reference default values according to load changes of the eMTC terminal based on the above description on "the mode of changing the $M_2$ value by step according to load changes of the eMTC terminal", which is thus not detailed here.

FIG. 2 is a diagram illustrating uplink resource allocation according to an exemplary embodiment of the present disclosure. In the figure, the resource configuration apparatus 41 configures PRB42 as a first resource block for the NB-IoT terminal to use, and the PRB 37-42 as the second resource block for the eMTC terminal to use; therefore, the PRB included in the shared resource group is PRB42. $N_1$=30, which means taking 30 ms as a repetition time period. The 30 ms period window shown in the figure ranges from the $8^{th}$ subframe of the $k^{th}$ subframe to the $7^{th}$ subframe of the k+$2^{nd}$ frame. $M_1$=10, indicating the time range of 10 subframes. In PRB42, the scheduling apparatus 42 takes the $8^{th}$ subframe of the $k^{th}$ frame to the $7^{th}$ subframe of the k+$1^{st}$ subframe (10 subframes in total) as $M_1$ consecutive subframes to schedule the NB-IoT terminal in the 10 subframes, while within the time period from the $8^{th}$ subframe of the k+$1^{st}$ frame to the $7^{th}$ subframe of the k+$3^{rd}$ frame left in the 30 ms period window on PRB42, the scheduling apparatus 42 will not schedule the NB-IoT terminal, because these resources may be reserved for the eMTC terminal to use.

FIG. 3 is a diagram illustrating uplink resource allocation according to another exemplary embodiment of the present disclosure. In the figure, the resource configuration apparatus 41 configures PRB42 as the first resource block for the NB-IoT terminal to use, and PRB37-42 as the second resource block for the eMTC terminal to use; therefore, the PRB included in the shared resource group is PRB42, and the NB-IoT terminal and the eMTC terminal commonly use the PRB42 resource. $N_2$=30, which means taking 30 ms as a repetition time period. The 30 ms period window shown in the figure ranges from the $9^{th}$ subframe of the $k^{th}$ subframe to the $8^{th}$ subframe of the k+$2^{nd}$ frame. $M_2$=10, indicating the time range of 10 subframes. In PRBs 37~41, the scheduling apparatus 42 takes the $9^{th}$ subframe of the $k^{th}$ frame to the $8^{th}$ subframe of the k+$1^{st}$ subframe (10 subframes in total) as $M_2$ consecutive subframes to schedule the eMTC terminal in the 10 subframes, while within the time period from the $9^{th}$ subframe of the k+$1^{st}$ frame to the $8^{th}$ subframe of the k+$3^{rd}$ frame left in the 30 ms period window on PRBs 37-41, the scheduling apparatus 42 will not schedule the eMTC terminal, because these resources may be reserved for the LTE terminal of other type to use.

It should be noted that the present disclosure may be implemented in software or a combination of software and hardware; for example, it may be implemented by a dedicated integrated circuit (ASIC) or any other similar hardware device. In an embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/ including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

Although the exemplary embodiments may have various kinds of modifications and alternative forms, only some embodiments thereof are illustrated exemplarily in the drawings, which will be described in detail here. However, it should be understood that the exemplary embodiments are not meant to be limited to the specific disclosed manners. On the contrary, the exemplary embodiments intend to cover all modifications, equivalent solutions and alternative solutions falling within the scope of the claims Like reference numerals always refer to the same units throughout the description of the drawings.

It should be noted before discussing the exemplary embodiments in more detail that some exemplary embodiments are described as processes or methods in the form of flow diagrams. Although a flow diagram depicts respective operations as being sequentially processed, many operations therein may be implemented in parallel, concurrently or simultaneously. Besides, Various operations may be re-ordered. When the operations are completed, the processing may be terminated. However, there may comprise additional steps not included in the accompanying drawings. The processing may correspond to a method, a function, a specification, a sub-routine, a sub-program, etc.

The term "wireless device" or "device" used here may be regarded as synonymous to the following items and sometimes may be referred to as the following items hereinafter: client, user equipment, mobile station, mobile user, mobile terminal, subscriber, user, remote station, access terminal, receiver, and mobile unit, etc., and may describe a remote user of a wireless resource in a wireless communication network.

The method discussed infra (some of which are illustrated through flow diagrams) may generally be implemented through hardware, software, firmware, middleware, microcode, hardware description language or any combination thereof. When it is implemented with software, firmware, middleware or microcode, the program code or code segment for executing necessary tasks may be stored in a machine or a computer readable medium (e.g., storage medium). (One or more) processors may implement the necessary tasks.

The specific structures and function details disclosed here are only representative, for a purpose of describing the exemplary embodiments of the present disclosure. Instead, the present disclosure may be specifically implemented through many alternative embodiments. Therefore, it should not be construed that the present disclosure is only limited to the embodiments illustrated here.

It should be understood that although terms like "first" and "second" might be used here to describe respective units, these units should not be limited by these terms. Use of these terms is only for distinguishing one unit from another. For example, without departing from the scope of the exemplary embodiments, a first unit may be referred to as a second unit, and similarly the second unit may be referred to as the first unit. The term "and/or" used here includes any and all combinations of one or more associated items as listed.

It should be understood that when one unit is "connected" or "coupled" to a further unit, it may be directly connected or coupled to the further unit, or an intermediate unit may exist. In contrast, when a unit is "directly connected" or "directly coupled" to a further unit, an intermediate unit does not exist. Other terms (e.g., "disposed between" VS. "directly disposed between," "adjacent to" VS. "immediately adjacent to," and the like) for describing a relationship between units should be interpreted in a similar manner.

The terms used here are only for describing preferred embodiments, not intended to limit exemplary embodiments. Unless otherwise indicated, singular forms "a" or "one" used here are also intended to include plural forms. It should also be appreciated that the terms "comprise" and/or "include" used here prescribe existence of features, integers, steps, operations, units and/or components as stated, but do not exclude existence or addition of one or more other features, integers, steps, operations, units, components, and/or a combination thereof.

It should also be noted that in some alternative embodiments, the functions/actions as mentioned may occur in an order different from what is indicated in the drawings. For example, dependent on the functions/actions involved, two successively illustrated diagrams may be executed substantially simultaneously or in a reverse order sometimes.

Unless otherwise defined, all terms (including technical and scientific terms) used herein have the same meanings as generally understood by those skilled in the art to which the exemplary embodiments relate. It should also be understood that unless explicitly defined here, those terms defined in common dictionaries should be construed to having meanings consistent with those in the context of a related art, and should not be construed according to ideal or too formal meanings.

Some parts of the exemplary embodiments and corresponding detailed depictions are provided through software or algorithms within a computer memory and symbol representations for operating data bits. These depictions and representations are depictions and representations used by a person skilled in the art to effectively convey the essence of his/her work to other technical persons in the art. As usually used, the term "algorithm" used here is envisaged a sequence of inherently consistent steps for obtaining a desired result. The steps refer to those steps that need physical manipulation of physical quantities. Generally, but not necessarily, these quantities adopt forms of optical, electric or magnetic signals that can be stored, transmitted, combined, compared and otherwise manipulated. Mainly for the sake of common use, it has been proved that it is sometimes convenient to refer to these signals as bits, numerical values, elements, symbols, characters, items, and digits.

In the depictions infra, illustrative embodiments may be described with reference to symbol representations (e.g., in the form of flow diagrams) of actions and operations that may be implemented as program modules or function processing. The program modules or function processing include routines, programs, objects, components, and data structures and the like which implement specific tasks or implement specific abstract data types, and may be implemented using existing hardware at existing network elements. Such existing hardware may include one or more central processing units (CPUs), digital signal processors (DSPs), specific integrated circuits, field programmable gate array (FPGA) computers, etc.

However, it should be aware that all of these and similar terms should be associated with appropriate physical quantities and are only employed as convenient tags for these quantities. Unless explicitly stated otherwise or clearly seen from the discussion, terms such as "processing," "computing," "determining" or "displaying" refer to actions and processing of a computer system or a similar electronic computing device, which manipulates data represented as physical and electronic quantities in a register or memory of the computer system, and such data are transformed into other data similarly represented as physical quantities in the computer system memory or register or other devices for storing, delivering or displaying such kind of information.

It should also be noted that software-implemented aspects of the exemplary embodiments are generally encoded on a program storage medium of a certain form or implemented through a certain type of transmission mediums. The program storage medium may be a magnetic (e.g., a floppy disk or hard disk driver) or optical (e.g., CD ROM) storage medium, and may be a read-only or random access storage medium. Similarly, the transmission medium may be a twisted pair, co-axial cable, optical fiber or certain other appropriate transmission medium well known in the art. The exemplary embodiments are not limited by these aspects in any given implementation manner.

The processor and the memory may jointly operate to run apparatus functions. For example, the memory may store code segments regarding the apparatus functions, while the code segments may also be executed by the processor.

Besides, the memory may store processing variables and constants available for the processor.

Although exemplary embodiments have been specifically illustrated and described above, those skilled in the art will understand that without departing from the spirit and scope of the claims, their forms and details may change somewhat. Here, the protection as sought is defined in the appended claims. These and other aspects of respective embodiments are prescribed in the following numbered clauses:

1. A method for allocating an uplink resource in a communication system, comprising:
   a. configuring a first resource block for a Narrow Band Internet of Things (NB-IoT) terminal and a second resource block for an enhanced Machine Type Communication (eMTC) terminal;
   b. scheduling the NB-IoT terminal and the eMTC terminal to commonly use the first resource block and the second resource block.

2. The method according to clause 1, wherein the step a comprises:
   determining part of the second resource block as a shared resource group in the first resource block.

3. The method according to clause 1, wherein the step b comprises:
   allocating $M_1$ consecutive subframes in every $N_1$ subframes in the first resource block to the NB-IoT terminal, wherein $M_1$ and $N_1$ are natural numbers;
   allocating remaining $N_1$-$M_1$ subframes in the shared resource group to the eMTC terminal.

4. The method according to clause 3, wherein the step b further comprises:
   re-determining a value of $M_1$ based on a load of the NB-IoT terminal.

5. The method according to clause 2, wherein the step b comprises:
   scheduling the eMTC terminal in a non-shared resource group other than the shared resource group in the second resource block.

6. The method according to clause 5, wherein the step of scheduling the eMTC terminal in a non-shared resource group comprises:
   allocating $M_2$ consecutive subframes in every $N_2$ subframes in the non-shared resource group to the eMTC terminal for use, wherein $M_2$ and $N_2$ are natural numbers;
   not allocating the remaining $N_2$-$M_2$ subframes in the non-shared resource group to the eMTC terminal for use.

7. The method according to clause 6, wherein the step of scheduling the eMTC terminal in a non-shared resource group further comprises:
   re-determining a value of $M_2$ according to a load of the eMTC terminal.

8. The method according to clause 1, further comprising:
   c. scheduling remaining unused resources in the first resource block and the second resource block to an LTE terminal of other type.

9. An apparatus for allocating an uplink resource in a communication system, comprising:
   a resource configuration apparatus configured to configure a first resource block for a Narrow Band Internet of Things (NB-IoT) terminal and a second resource block for an enhanced Machine Type Communication (eMTC) terminal;
   a scheduling apparatus configured to schedule the NB-IoT terminal and the eMTC terminal to commonly use the first resource block and the second resource block.

10. The apparatus for allocating an uplink resource according to clause 9, wherein the resource configuration apparatus comprises:
    a shared resource configuration module configured to determine part of the second resource block as a shared resource group in the first resource block.

11. The apparatus for allocating an uplink resource according to clause 9, wherein the scheduling apparatus comprises:
    a first subframe allocating module configured to allocate $M_1$ consecutive subframes in every $N_1$ subframes in the first resource block to the NB-IoT terminal, wherein $M_1$ and $N_1$ are natural numbers;
    a first remaining subframe allocating module configured to allocate remaining $N_1$-$M_1$ subframes in the shared resource group to the eMTC terminal.

12. The apparatus for allocating an uplink resource according to clause 11, wherein the scheduling apparatus comprises:
    a first re-determining module configured to re-determine a value of $M_1$ based on a load of the NB-IoT terminal.

13. The apparatus for allocating an uplink resource according to clause 10, wherein the scheduling apparatus comprises:
    a non-shared resource scheduling module configured to schedule the eMTC terminal in a non-shared resource group other than the shared resource group in the second resource block.

14. The apparatus for allocating an uplink resource according to clause 10, wherein the non-shared resource scheduling module comprises:
    a second subframe allocating unit configured to allocate $M_2$ consecutive subframes in every $N_2$ subframes in the non-shared resource group to the eMTC terminal for use, wherein $M_2$ and $N_2$ are natural numbers;
    a second remaining subframe allocating unit configured to not allocate the remaining $N_2$-$M_2$ subframes in the non-shared resource group to the eMTC terminal for use.

15. The apparatus for allocating an uplink resource according to clause 14, wherein the non-shared resource scheduling module further comprises:
    a second re-determining unit configured to re-determine a value of $M_2$ according to a load of the eMTC terminal.

16. The apparatus for allocating an uplink resource according to clause 9, further comprising:
    a remaining resource scheduling apparatus configured to schedule remaining unused resources in the first resource block and the second resource block to an LTE terminal of other type.

17. A network device in a communication system, comprising an apparatus for allocating an uplink resource according to any one of clauses 9~16.

The invention claimed is:
1. A method for allocating an uplink resource in a communication system, comprising:
   configuring a first resource block for a Narrow Band Internet of Things (NB-IoT) terminal and a second resource block for an enhanced Machine Type Communication (eMTC) terminal;
   scheduling the NB-IoT terminal and the eMTC terminal to commonly use the first resource block and the second resource block;
   determining part of the second resource block as a shared resource group in the first resource block, wherein the shared resource group includes mutually overlapping subframes from the first and second resource blocks;

allocating $M_1$ consecutive subframes in every $N_1$ subframes in the first resource block to the NB-IoT terminal, wherein $M_1$ and $N_1$ are natural numbers; and allocating remaining $N_1$-$M_1$ subframes in the shared resource group to the eMTC terminal.

2. The method according to claim 1, wherein the scheduling further comprises:

re-determining a value of $M_1$ based on a bad of the NB-IoT terminal.

3. The method according to claim 1, wherein the scheduling comprises:

scheduling the eMTC terminal in a non-shared resource group other than the shared resource group in the second resource block.

4. The method according to claim 3 wherein the scheduling the eMTC terminal in a non-shared resource group comprises:

allocating $M_2$ consecutive subframes in every $N_2$ subframes in the non-shared resource group to the eMTC terminal for use, wherein $M_2$ and $N_2$ are natural numbers;

not allocating the remaining $N_2$-$M_2$ subframes in the non-shared resource, group to the eMTC terminal for use.

5. An apparatus for allocating an uplink resource in a communication system, comprising:

at least one processor; and at least one memory including computer program code;

wherein the at least one memory and the computer program code are configured to, with the at least one processor, cause the apparatus to configure a first resource block for a Narrow Band Internet of Things (NB-IoT) terminal and a second resource block for an enhanced Machine Type Communication (eMTC) terminal;

wherein the at least one memory and the computer program code are configured to, with the at least one processor, cause the apparatus to schedule the NB-IoT terminal and the eMTC terminal to commonly use the first resource block and the second resource block;

wherein the at least one memory and the computer program code are configured to, with the at least one processor, cause the apparatus to determine part of the second resource block as a shared resource group in the first resource block, wherein the shared resource block includes mutually overlapping subframes from the first and second resource blocks;

wherein the at least one memory and the computer program code are configured to, with the at least one processor, cause the apparatus to allocate $M_1$ consecutive subframes in every $N_1$ subframes in the first resource block to the NB-IoT terminal, wherein $M_1$ and $N_1$ are natural numbers;

wherein the at least one memory and the computer program code are configured to, with the at least one processor, cause the apparatus to allocate remaining $N_1$-$M_1$ subframes in the shared resource group to the eMTC terminal.

6. The apparatus for allocating an uplink resource according to claim 5, wherein the at least one memory and the computer program code are configured to, with the at least one processor, cause the apparatus to re-determine a value of $M_1$ based on a load of the NB-IoT terminal.

7. The apparatus for allocating an uplink resource ccording to claim 5, wherein the at least one memory and the computer program code are configured to, with the at least one processor, cause the apparatus to schedule the eMTC terminal in a non-shared resource group other than the shared resource group in the second resource block.

8. The apparatus for allocating an uplink resource according to claim 7, wherein the at least one memory and the computer program code are configured to, with the at least one processor, cause the apparatus to allocate $M_2$ consecutive subframes in every $N_2$ subframes in the non-shared resource group to the eMTC terminal for use, wherein $M_2$ and $N_2$ are natural numbers;

wherein the at lease one memory and the computer program code are configured to, with the at least one processor, cause the apparatus to not allocate the remaining $N_2$-$M_2$ subframes in the non-shared resource group to the eMTC terminal for use.

9. The apparatus for allocating an uplink resource according to claim 8, wherein the at least one memory and the computer program code are configured to, with the at least one processor, cause the apparatus to a re-determine a value of $M_2$ according to a load of the eMTC terminal.

10. The apparatus for allocating an uplink resource according to claim 5, wherein the at least one memory and the computer program code are configured to, with the at least one processor, cause the apparatus to schedule remaining unused resources in the first resource block and the second resource block to an LTE terminal of other type.

11. A network device in a communication system, comprising an apparatus for allocating an uplink resource according to claim 5.

12. A method for allocating an uplink resource in a communication system, comprising:

configuring a first resource block for a Narrow Band Internet of Things (NB-IoT) terminal and a second resource block for an enhanced Machine Type Communication (eMTC) terminal;

scheduling the NB-IoT terminal and the eMTC terminal to commonly use the first resource block and the second resource block:

determining part of the second resource block as a shared resource group in the first resource block; and scheduling the eMTC terminal in a non-shared resource group other than the shared resource group in the second resource block by allocating $M_2$ consecutive subframes in every $N_2$ subframes in the non-shared resource group to the eMTC terminal for use, wherein $M_2$ and $N_2$ are natural numbers and not allocating the remaining N2-M2 subframes in the non-shared resource group to the eMTC terminal for use.

13. The method according to claim 12, wherein the scheduling comprises:

allocating $M_1$ consecutive subframes in every $N_1$ subframes in the first resource block to the NB-IoT terminal, wherein $M_1$ and $N_1$ are natural numbers; allocating remaining $N_1$-$M_1$ subframes in the shared resource group to the eMTC terminal.

14. The rrmethod according to claim 13, whereinthe scheduling further comprises:

re-determining a value of Mrt based on a load of the NB-IoT terminal.

* * * * *